United States Patent [19]
Klapproth et al.

[11] 3,770,235
[45] Nov. 6, 1973

[54] RESILIENTLY SUPPORTED SEAT

[75] Inventors: Edward H. Klapproth, Mansfield; Donald J. Sparr, Loudonville, both of Ohio

[73] Assignee: The Flexible Co., Loudonville, Ohio

[22] Filed: Mar. 20, 1972

[21] Appl. No.: 236,484

[52] U.S. Cl. ................. 248/399, 248/22, 297/300
[51] Int. Cl. ............................................ A47c 3/025
[58] Field of Search .............. 248/399, 375, 387, 248/24, 22, 8, 9, 358 R; 297/300, 345

[56] References Cited
UNITED STATES PATENTS

| | | | |
|---|---|---|---|
| 1,362,041 | 12/1920 | Roe ................................ 248/399 |
| 1,805,175 | 5/1931 | Hanak ........................ 248/358 R |
| 1,997,254 | 4/1935 | Forsythe et al. ............. 248/358 R |
| 2,076,034 | 4/1937 | Lampman .................... 248/358 R |
| 2,368,727 | 2/1945 | Robinson ..................... 248/358 R |
| 2,845,111 | 7/1958 | Barecki et al. ................... 248/387 |
| 3,112,950 | 12/1963 | Jaskowiak ........................... 248/9 |
| 3,159,391 | 12/1964 | Wilfert et al. ...................... 248/9 |
| 3,350,042 | 10/1967 | Stewart et al. ................... 248/22 |
| 3,622,194 | 11/1971 | Bryk ................................... 248/9 |

FOREIGN PATENTS OR APPLICATIONS 917,583    9/1954    Germany ..................... 248/358 R

*Primary Examiner*—Marion Parsons, Jr.
*Attorney*—Vern L. Oldham et al.

[57] ABSTRACT

A resilient seat support wherein an upper frame and a lower frame are provided in a seat and resilient isolation dampeners support the upper frame on the lower frame. Each isolation dampener includes a pair of bushings positioned in vertical alignment with each other and centering and compression means connecting the bushings and securing the upper and lower frames together by cushioning means as the sole load support members.

4 Claims, 4 Drawing Figures

PATENTED NOV 6 1973　　　　　　　　　　　　　　　3,770,235

RESILIENTLY SUPPORTED SEAT

The invention particularly relates to a novel and improved vehicle seat, and especially to a seat including upper and lower frames wherein the upper frame is resiliently supported on the lower frame by rubber bushings and associated control members.

BACKGROUND OF INVENTION

Heretofore there have been various types of seats proposed, and many of such seats have been adapted for use in vehicles. One previously patented construction is that wherein an upper seat or frame is resiliently supported by leaf springs on a fixed lower frame as per U.S. Pat. No. 2,845,111. Various other types of seat constructions have been proposed heretofore wherein some type of rubber bushing or support means is used between relatively movable portions of the seat components. Some of such previously proposed constructions are shown and described in U.S. Pat. Nos. 2,183,564; 2,690,786; 2,286,168 and 2,301,903. Insofar as we are aware, none of such prior constructions have been completely satisfactory in providing a sturdy, dependable seat support unit wherein the units will function effectively over a long service life and be substantially maintenance free.

The general object of the present invention is to provide a novel and improved seat construction, and especially one wherein vibrations and bumps of the vehicle on which the seat is mounted are not transmitted from the lower part of the seat frame to a person supported on the upper portion of the seat.

Another object of the invention is to provide improved vibration insulation and/or isolation dampening means in a seat to provide a comfortable support for a person riding in a vehicle and sitting on a seat of the invention.

Yet a further object of the invention is to provide novel and improved resilient vibration isolation means in the support for an upper frame on a lower frame in a vehicle seat and to use a pair of vertically aligned rubber bushings in making the support means of the invention and to secure them to the associated frame means of the seat by a center compression member.

A further object of the invention is to provide a novel and effective elastomer cushioned construction for avoiding any metal to metal contact in the support means provided for an upper frame of the seat, and to permit 3-dimensional movement.

Another object of the invention is to provide a substantially maintenance free, vibration and impact isolation and/or dampening means in a seat assembly and to provide means for adjusting the compressive forces set up in and the support action of the isolation means provided in the seat support of the invention.

The foregoing and other objects and advantages of the invention will be made more apparent as the specification proceeds.

Reference now is particularly directed to the accompanying drawings, wherein.

When referring to corresponding members shown in the drawings and referred to in the specification, corresponding numerals are used to facilitate comparison therebetween.

SUBJECT MATTER OF INVENTION

Figure 1:
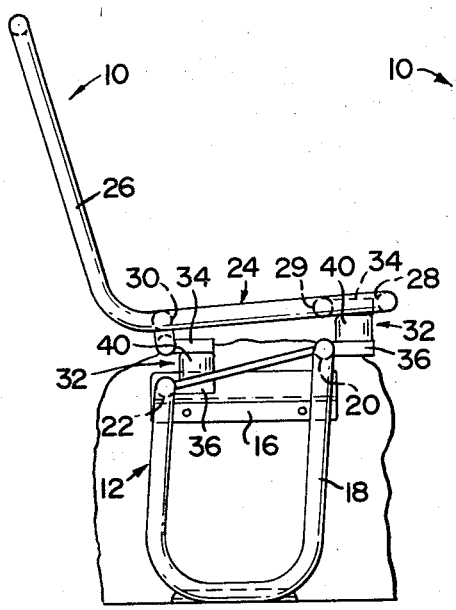
FIG. 1 is a side elevation of a seat embodying the principles of the invention with only the frame members of the seat being shown and any cushioning means thereon being omitted for purposes of clarity.
Figure 2:
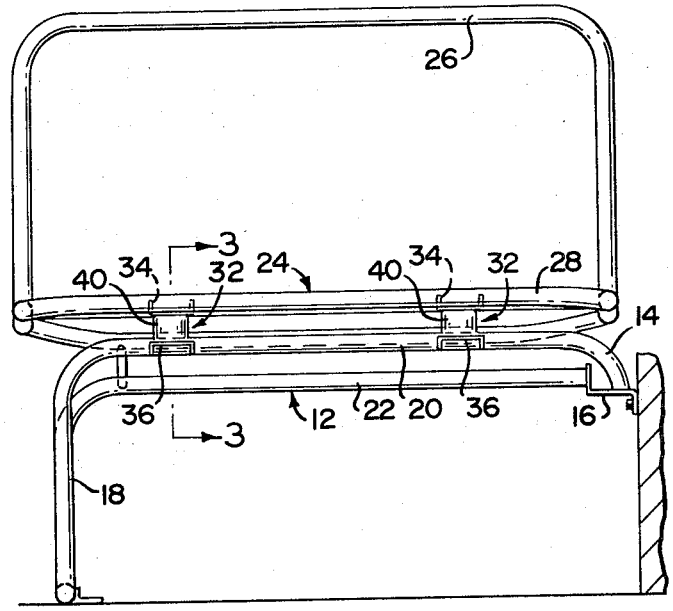
FIG. 2 is a front elevation of the seat of the invention.

The invention, as one embodiment thereof, relates to a seat construction including an upper frame and a lower frame and wherein the upper frame is supported on the lower frame by a plurality of isolation means each comprising an upper support member attachable to the upper frame, a lower support member attachable to the lower frame, a rubber bushing positioned between and engaging the upper and lower members, a lower bushing positioned below and engaging the lower member, and means compressibly connecting the bushings together for supporting the seat through the resilient bushings and compression engagement therebetween.

Attention now is particularly directed to the details of the structure shown in the drawings, and a seat embodying the principles of the invention is indicated as a whole by the numeral 10. This seat 10 is particularly adapted for use in vehicles, such as buses, and the seat includes a lower frame 12 one end 14 of which is shorter than the other end of such frame and is adapted to be attached to a wall bracket 16 or equivalent member provided on the vehicle. The other end portion of the lower frame 12, indicated by the numeral 18 is suitably secured to the support floor of the vehicle. This lower frame includes front and rear cross bars 20 and 22. An upper frame is indicated as a whole by the numeral 24 and it may comprise a tubular member including a back 26. The upper frame 24 also includes front and rear cross bars 28 and 30, in most instances. The upper frame 24 may have any suitable seating means provided thereon and this may include a resin, molded plastic support construction formed integrally with the upper frame 24, or any other suitable seat support means can be secured to the upper frame 24 to form the operative seat thereon, as desired.

It is an important feature of the present invention that a plurality, normally four vibration isolation members or dampeners 32 are provided for resiliently supporting the upper frame 24 on the lower frame 12 so as to permit vertical movement of the upper frame and any load carried thereon as well as permitting limited lateral and front to rear movement of the upper frame in relation to the lower frame when shocks, impacts or other forces are exerted on the vehicle in which the seat 10 is positioned. The seat is designed to prevent transmission of any excessive vibrations, shocks or impacts to a person supported on the upper frame 24 of the seat and to isolate the person from such vibrations, etc. Such three-dimensional freedom of movement of the upper frame is provided by the isolation means, or vibration insulators 32 of the invention to provide a comfortable load support action for a person riding on the seat 10.

Figure 3:
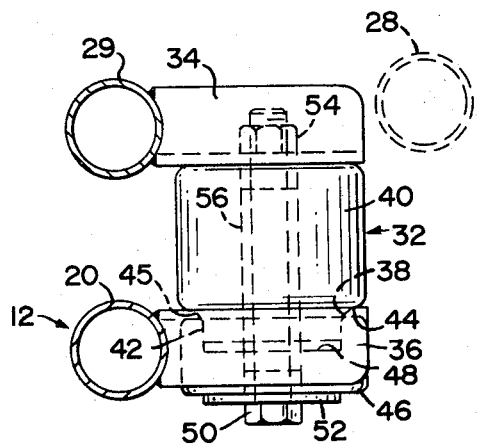
FIG. 3 is a fragmentary elevation, partially shown in vertical section, of a vibration dampener or isolation means of the invention and taken on line 3—3 of FIG. 2.
Figure 4:
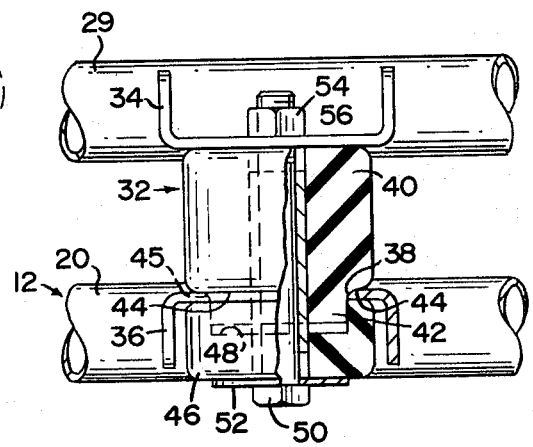
FIG. 4 is a vertical section through a portion of the dampening unit of the invention.

FIGS. 3 and 4 show further features and details of the isolation means 32 and thus, each of these isolation dampeners includes an upper member such as a bracket 34, and a lower member such as a bracket 36.

Preferably each of these brackets 34 are of substantially U-shape in cross section for maximum strength therein, and these brackets are attached as cantilevers to vertically adjacent portions of the upper and lower frames. The brackets are welded, for example, to a cross bar 29 in the upper frame for support of the upper bracket 34 and the lower bracket 36 is welded to the front cross bar 20 of the lower frame. The lower bracket 36 has a center aperture or hole 38 formed therein. In order to provide resilient load support action, a flexible, resilient bushing 40 is positioned adjacent the lower surface of the upper bracket 34 and it extends down to and normally abuts on the upper surface of the lower bracket 36 for compressive load transfer and/or engagement therebetween. This bushing 40 has a reduced diameter lower end 42 which extends through the aperture 38 in the lower bushing and it has a downwardly facing shoulder 44. The shoulder 44 connects to the lower end of the bushing by a fillet 45, and with the upper edge of the lower bracket 36 adjacent the aperture normally being beveled or slanted outwardly at the aperture 38 to provide no sharp or cutting surface on the lower bracket for tending to tear the rubber bushing 40 in its compressive load transfer engagement with the lower bracket.

A lower bushing 46 is positioned below the support surface of the lower bushing 36 and is centered at the aperture 38 therein. Such lower bushing 36 has a recess 48 provided in its upper surface and it telescopically receives the lower end 42 of the upper bushing. The upper end of the lower bushing 46 engages the under surface of the lower bracket 36.

A suitable adjustable compression control and assembly means, such as a bolt 50 is provided for retaining the upper and lower bushings in engagement with and extending between the brackets 34 and 36 and to set up controllable compressive forces thereon. This bolt 50 engages the lower end of the lower bushing as by a washer 52 carried by the bolt and with the bolt extending up through center bores or apertures provided in both of the bushings 46 and 40 and in the upper bracket. The bolt has a lock nut or other suitable securing means 54 on its upper end which extends through the upper bracket 34. Preferably, a metal control bushing or sleeve 56 is carried by the shank of the bolt 50 and such bushing or sleeve is normally shorter than the uncompressed length of the two bushings 40 and 46 when assembled in the manner shown. Usually some compression area or flow space is provided between the lower end of the upper bushing and the lower surface of the recess 48 formed in the upper end of such lower bushing. Hence, by tightening the bolt 50, a controllable amount of compression can be set up on the bushings 40 and 46 to vary the resilient supporting and vibration isolation or dampening action provided therebetween. It will be seen that there is no metal to metal contact between any portion of the upper frame and the lower frame to limit movement of the upper frame or to transmit bumps or vibrations thereto. Also, the support means provides three dimensional movement of the upper frame and the seat support action can be varied by changing the compressive action of the bolt 50.

The resilient bushings 40 and 46 obviously can be made from any suitable elastomeric material and usually are molded to predetermined shapes. The compounding of the bushings can be conventional as is used in resilient load carrying bushings of the type of the present invention so as to provide a tough, vulcanized, resilient, load support member.

By this construction of the invention, a very effective isolation means or support has been provided between the upper and lower frames in a seat and a very satisfactory but sturdy load support action has been obtained. Thus, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. In a seat construction including an upper frame and a lower frame, the improvement comprising a plurality of isolation means connecting said upper frame to said lower frame for support thereon, said isolation means each comprising an upper member attached to said upper frame and a lower member aligned with and opposed to said upper member but attached to said lower frame, a resilient bushing positioned between and engaging said upper and lower members to support said upper member without shear forces being normally applied to said bushings, a lower resilient bushing positioned below and engaging said lower member, means connecting said bushings together; and said lower member havng an aperture therein, said lower bushing having a top recess therein below said aperture, said upper bushing having a downwardly facing shoulder engaging said lower member and an end portion extending through said aperture and received in but not filling said recess.

2. In a seat construction as in claim 1, the improvement comprising a center compression means secured to said upper member and extending down through said bushings and operatively engaging the lower end of said lower bushing to secure said bushings and members together, and a metal control sleeve encompassing said compression means to limit the compression of said bushings.

3. In a seat construction as in claim 1, the improvement of said bushings forming a load transfer means between said frames, and said isolation means operatively securing said bushings to said frames to provide for relative movement therebetween.

4. In a vehicular seat construction as in claim 1, the improvement of said bushings being operatively engaged with said members to permit three directional movement of the upper frame in relation to the lower frame.

* * * * *